United States Patent [19]

Itami et al.

[11] Patent Number: 5,726,699
[45] Date of Patent: Mar. 10, 1998

[54] CLOSED TYPE POLYGON SCANNER

[75] Inventors: Yukio Itami; Mitsuo Suzuki, both of Yokohama, Japan

[73] Assignee: Ricoh Company, Ltd., Tokyo, Japan

[21] Appl. No.: 440,350

[22] Filed: May 12, 1995

[30] Foreign Application Priority Data

May 13, 1994 [JP] Japan .................. 6-098983

[51] Int. Cl.$^6$ .................. B41J 2/47; G02B 26/00
[52] U.S. Cl. .................. 347/257; 347/261
[58] Field of Search .................. 347/260, 261, 347/242, 243, 257, 138, 245, 263; 359/196, 216

[56] References Cited

U.S. PATENT DOCUMENTS

| | | | |
|---|---|---|---|
| 4,726,640 | 2/1988 | Iwama et al. | 350/6.8 |
| 5,069,515 | 12/1991 | Itami et al. | 359/200 |
| 5,179,464 | 1/1993 | Morita et al. | 359/217 |
| 5,270,737 | 12/1993 | Makasugi et al. | 346/108 |
| 5,363,231 | 11/1994 | Komori | 359/219 |
| 5,367,399 | 11/1994 | Kramer | 359/206 |
| 5,430,570 | 7/1995 | Takahashi | 359/216 |
| 5,434,695 | 7/1995 | Saito et al. | 359/200 |
| 5,530,579 | 6/1996 | Nakamura et al. | 359/216 |
| 5,555,123 | 9/1996 | Kaplan | 359/197 |
| 5,583,559 | 12/1996 | Nakamura et al. | 347/260 |
| 5,598,292 | 1/1997 | Yoshikawa et al. | 359/216 |
| 5,606,448 | 2/1997 | Suzuki et al. | 359/200 |
| 5,610,751 | 3/1997 | Sweeney et al. | 359/197 |

*Primary Examiner*—Safet Metjahic
*Assistant Examiner*—Christopher E. Mahoney
*Attorney, Agent, or Firm*—Oblon, Spivak, McClelland, Maier & Neustadt, P.C.

[57] ABSTRACT

A closed type polygon scanner has a housing, a rotor which is rotatively supported to a rotating shaft fixed to the housing and which includes a polygon mirror, a motor which generates a magnetic force to the rotor and rotates the rotor, and a cover. The cover includes an outer peripheral portion fixed to an outer peripheral portion of the housing, and covers the rotor together with the housing. An opening is formed at a predetermined portion in the cover facing a mirror surface of the polygon mirror through which a laser beam passes, and a window member is fixed to the opening in closed state. An inner peripheral surface of the cover facing the mirror surface of the polygon mirror is formed cylindrically and almost coaxially to a rotating axis of the rotating shaft, and a width in the rotating axis direction of the opening is set to a predetermined width relative to a width of the polygon mirror so that turbulent air generated around the polygon mirror is reduced.

15 Claims, 7 Drawing Sheets

CLOSED TYPE POLYGON SCANNER

BACKGROUND OF THE INVENTION

1. Field of the Invention

The present invention relates to a closed type polygon scanner, and more particularly to a polygon scanner used in a laser printer, a digital copying machine, a laser facsimile machine, etc.

2. Discussion of the Background

Recently, laser printing apparatuses employing a electrophotographic system such as a digital copying machine, laser facsimile, laser printer and etc. have rapidly spread because of high quality printing, high speed printing, low noise, low price, etc. Such laser printing apparatuses frequently use a polygon scanner as a deflector for a laser beam scanning. This polygon scanner requires a rotating speed in accordance with printing speed and pixel density in the printing apparatus.

Further, the polygon scanner requires high speed rotating of 15000 to 20000 or more revolutions per minute as the printing speed becomes higher and the pixel density becomes higher. Therefore, as a conventional ball bearing is not capable of meeting required quality because of service life, noise, etc., a dynamic pressure air bearing with grooves has been used in the polygon scanner for high speed rotating, instead of a ball bearing. In addition, as the printing apparatus becomes smaller in size, and lower in cost and noise, the polygon scanner of dynamic pressure air bearing type is desired to obtain those needs.

Generally, a closed structure is used in the polygon scanner for high speed rotating employing the dynamic pressure air bearing in order to prevent fine dust from accumulating on the polygon mirror and the bearing. Such a closed structure polygon scanner is described for example in Japanese Utility Model Publication 61-18490, wherein a rotor is enclosed by a cover and a housing for storing a motor which drives the rotor including the polygon mirror.

On the other hand, there is an open type which rotates a polygon mirror at high speed, instead of the above closed type. However, air flow loss by the polygon mirror is high in this type, and therefore a high output motor is required. Further the motor generates heat and the heat badly affects a laser scanning optical path.

There is for example Japanese Laid Open Patent 58-46317 as such the polygon scanner of the closed type decreasing the air flow loss, which stores a polygon mirror as well as a laser diode and a convergent lens within a closed body of box type and installs a board around the polygon mirror except openings which input and output a laser beam.

Since low noise is required in the polygon scanner for high speed rotating, it is an very important element to cut off noise from the air flow. In the above Japanese Laid Open Patent 58-46317, as the board for decreasing air flow loss has openings for inputting and outputting the laser beam, the following problems occur, that is, not only noise leaks but also other noise generated by friction between the openings of the board installed closer to the polygon mirror and the air flow at high speed.

Thus, the polygon scanner for high speed rotating necessarily requires a closed structure, for example that a glass window etc., is fixed on the openings for inputting and outputting the laser beam in order to achieve low noise.

Figure 5:
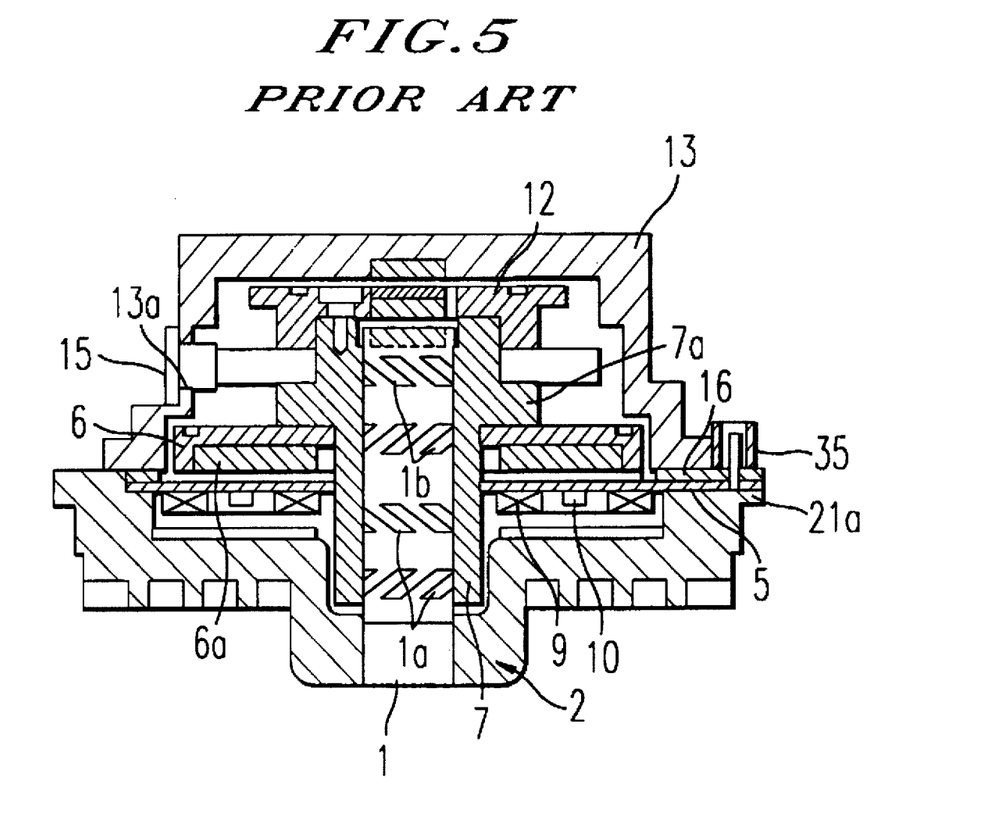
FIG. 5 is a vertical sectional view showing a prior art closed type polygon scanner.
Figure 6:
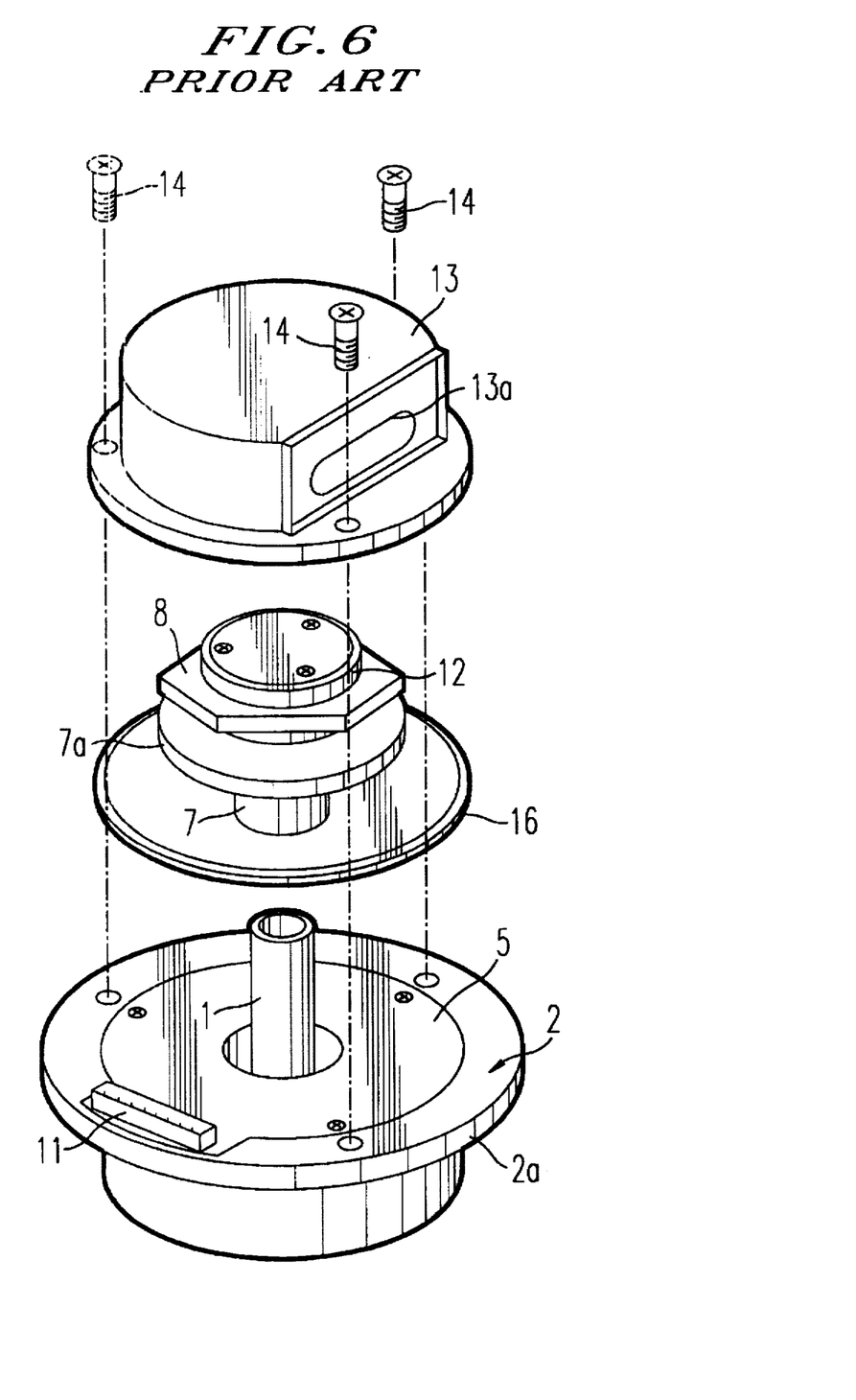
FIG. 6 is a perspective exploded view showing a main part of the polygon scanner of the prior art.
Figure 7:
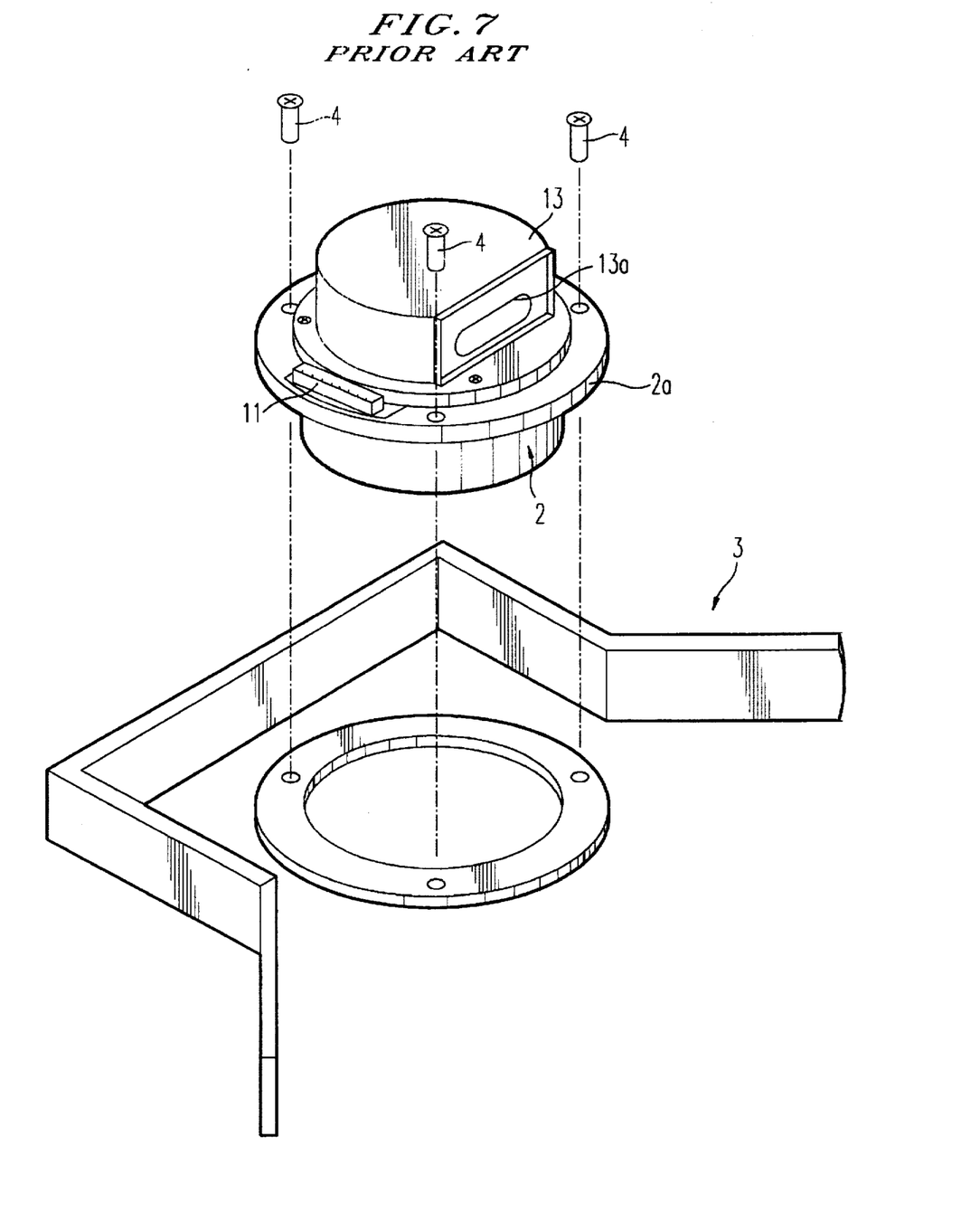
FIG. 7 is an exploded view showing a optical housing and the polygon scanner of the prior art.

There is for example Japanese Laid Open Patent 6-3615 as the closed type polygon scanner which cuts off the air flow noise and reduces an assembly cost, which is shown in FIGS. 5–7. FIG. 5 is a vertical sectional view of the closed type polygon scanner. FIG. 6 is a perspective exploded view of a main part of the polygon scanner, and FIG. 7 is a exploded view of the optical housing and the closed type polygon scanner.

In FIGS. 5–7, numeral 1 designates a fixed shaft and it is fixed to a housing 2. A reference surface 2a is fixed to an optical housing 3 by screws 4.

A printed-circuit board 5 is fixed on the housing 2 by glue etc. This printed-circuit board faces a rotor flange 6 having rotor magnets 6a.

The rotor flange 6 is fixed to a hollow rotating shaft 7, and this hollow rotating shaft 7 contacts the fixed shaft 1. Pairs of herringbone grooves are formed on this fixed shaft 1. When the hollow rotating shaft 7 rotates, air pressure becomes high in a gap between the hollow rotating shaft 7 and the fixed shaft 1, and therefore a dynamic pressure air bearing, which supports the rotating shaft 7 in a non-contacting manner, is formed.

Further, a polygon mirror 8 is fixed to and rotates with the hollow rotating shaft 7. Wiring coils and Hall elements 10 are fixed on the lower surface of a printed-circuit board 5 and are connected to a connector 11 by print pattern. Thus a brushless motor is composed of those elements and the magnetic field between the rotor magnets 6 and the wiring coils 9 rotates the hollow rotating shaft.

Moreover, a polygon mirror 8 is fixed to the hollow rotating shaft 7 by an upper surface of the flange 7a of the hollow rotating shaft 7 and a mirror keeper 12. The rotor flange 6 is fixed on a lower surface of the flange 7a.

On the other hand, a rotor comprising the hollow rotor shaft 7, polygon mirror 8, etc. is covered with a cover 13 and this cover 13 is fixed to the housing 2 by the screws 14 as shown in FIG. 6. An opening 13a, which inputs and outputs the laser beam to/from the polygon mirror 8 is formed at a portion of the cover, which faces a mirror surface of the polygon mirror 8. A glass window is fixed on this opening 13a by glue, double-sided tape, etc. Numeral 16 designates a closing member.

In such the closed type polygon scanner comprising the above structure, as the rotor is stored by the housing 2 and the cover 13 and the glass window is fixed to an opening 13a of the cover 13, the rotor is enclosed by the housing 2 and the cover 13. Therefore air flow noise is reduced. Moreover, as a part of the printed-circuit board 5 is exposed from between the housing 2 and the cover 13 and a connector 11 is installed at the exposed portion, a wire is easily connected to the printed-circuit board from outside. Therefore efficiency for assembly is improved and assembly cost of the polygon scanner is decreased.

However, in such the conventional closed type polygon scanner, the width of the opening is formed wide compared to the thickness of the polygon mirror in the direction of the rotating axis, and the inner surface of the cover 13 is not a completely continuous curved surface. Thus, as the rotor rotates at higher speed, the speed of the air flow around the polygon mirror becomes higher, and therefore turbulent air flow which is generated there becomes higher.

As a result, this turbulent flow causes rotating error. Therefore the following problem occurs, that is, printing quality becomes low and power consumption becomes high, whereby reliability of the polygon scanner becomes low.

Especially, as the size of the polygon scanner becomes smaller, the moment of inertia of the rotor becomes lower. In that case, the rotating error by the turbulent flow becomes

3 larger whereby the reliability of the polygon scanner becomes lower.

SUMMARY OF THE INVENTION

Accordingly, one object of the present invention is to provide a closed type polygon scanner wherein rotating error by a turbulent flow generating around the polygon mirror is reduced, and therefore printing quality is high and power consumption is low, whereby reliability is high.

Another object of the present invention is to provide a closed type polygon scanner of low cost in addition to the above.

These and other objects and advantages are achieved by the present invention which provides for a closed type polygon scanner comprising a housing, a rotor which is rotatively supported by a rotating shaft fixed to the housing and which includes a polygon mirror, a motor which generates a magnetic force to the rotor and rotates the rotor, a cover of which an outer peripheral portion is fixed to an outer peripheral portion of the housing and which covers the rotor together with the housing, an opening which is formed at a predetermined portion in the cover facing a mirror surface of the polygon mirror and through which a laser beam passes, a window member fixed to the opening in closed state, wherein an inner peripheral surface of the cover facing the mirror surface of the polygon mirror is formed cylindrically and almost coaxially to a rotating axis of the rotating shaft, and a width in the rotating axis direction of the opening is set to a predetermined width relative to a width of the polygon mirror so that turbulent air generated around the polygon mirror can be reduced.

BRIEF DESCRIPTION OF THE DRAWINGS

In describing preferred embodiment of the present invention illustrated in the drawings, specified terminology is employed for the sake of clarity. However, the invention is not intended to be limited to the specific terminology so selected, and it is to be understood that each specific element includes all technical equivalents which operate with a similar purpose.

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENT

Referring now to the drawings, embodiments will be described.

Figure 1A:
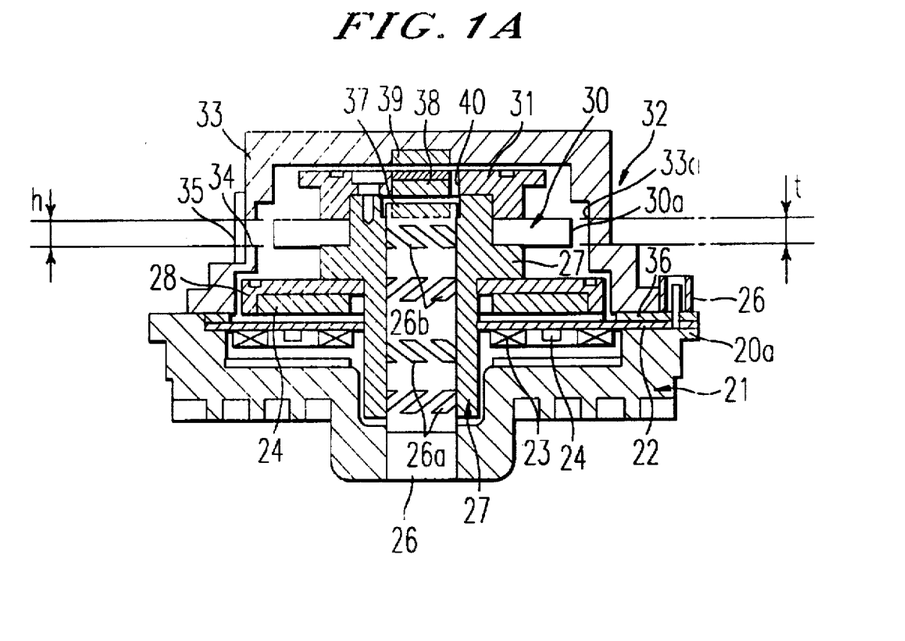
FIG. 1(a) is a vertical sectional view showing a closed type polygon scanner of a first embodiment of the present invention.
Figure 1B:
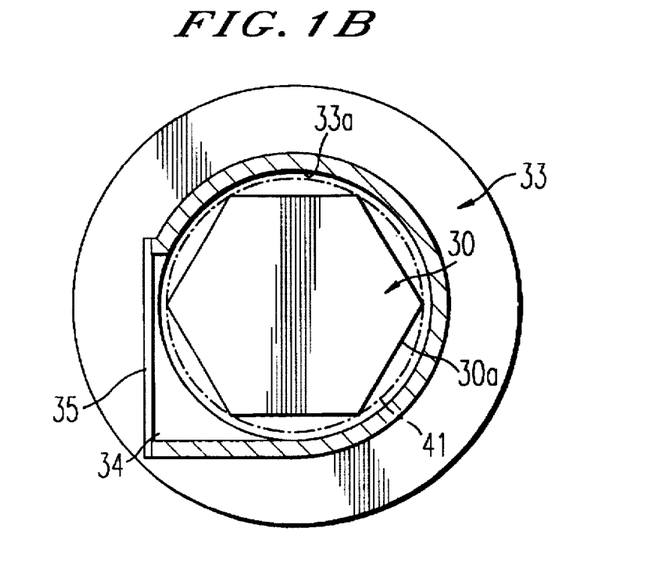
FIG. 1(b) is a horizontal sectional view showing a main part of the polygon scanner of the first embodiment of the present invention.

FIG. 1(a) is a vertical sectional view showing a closed type polygon scanner of a first embodiment of the present invention and FIG. 1(b) is a horizontal sectional view showing a main part of the polygon scanner of the first embodiment of the present invention.

First, the structure of the first embodiment will be described. In FIG. 1, numeral 21 designates a housing. A flange 21a is formed in an upper portion of the housing 21 and a lower surface of the flange 21a is a reference surface when it is fixed to an optical housing not shown in FIGS. 1(a) and 1(b), that is the same as the prior art. After the lower surface is installed to the optical housing, the flange 21a is fixed thereto by plural screws.

A printed-circuit board 22 is installed above the flange 21a of the housing 21 and is fixed to the housing 21 by plural screws not shown in FIGS. 1(a) and 1(b). The printed-circuit board can be fixed to the housing by glue.

Wiring coils and Hall elements 24 are fixed on a lower surface of the printed-circuit board 22 and are connected to a connector 25 by print pattern on the printed-circuit board.

A fixed shaft 26 is fixed almost in the center of the housing 21 by shrinkage fitting or press fitting and pairs of herringbone grooves 26a and 26b forming a dynamic pressure air bearing are formed on the fixed shaft 26. A hollow rotating shaft 27 is installed around the fixed shaft 26 and the hollow rotating shaft 27 is rotatively supported around the fixed shaft 26 by a narrow gap.

A rotor flange 28 is installed almost in the center of the hollow rotating shaft 27 and rotor magnets 29 are adhesively fixed on a lower surface of the flange 28. The magnets 29 face the wiring coils 23. When three phase alternating voltage is applied to the wiring coils and therefore a rotating magnetic field is generated around the rotating shaft 27, the magnets repel and attract the rotating magnetic field and they rotate together with the rotating shaft 27. At that time, pressure in a gap between the hollow rotating shaft 27 and the fixed shaft 26 becomes high and the hollow rotating shaft rotates, without contacting the fixed shaft 26. Therefore a coreless brushless motor is composed of those elements.

A polygon mirror 30 is installed on a flange 27a formed almost at the upper portion of the hollow rotating shaft 27 and the polygon mirror 30 is fixed on the flange 27a by a mirror keeper 31, which is fixed on an upper surface of the hollow rotating shaft 27 by screws not shown in FIGS. 1(a) and 1(b). A rotor 32 is composed of the hollow rotating shaft 27, rotor flange 28, magnets 29 and polygon mirror 30 and it rotates around the fixed shaft 26.

On the other hand, an outer peripheral portion of a cover 33 is fixed on an outer peripheral portion of the housing 21 by screws not shown in FIGS. 1(a) and 1(b). A cover 33 covers the rotor 32 and a space is formed by the cover 33 and the housing 22. An inner surface 33a of the cover 33, which faces a mirror surface 30a of the polygon mirror 30, is formed cylindrically and almost coaxially to an axis of the rotor 32. An opening 34 for inputting and outputting to/from the polygon mirror 30 is formed at a predetermined portion of the inner surface 33a.

Width h of the opening 34 in the direction of the axis of the rotor is set at a predetermined width relative to the width t of the polygon mirror 30, because a turbulent flow around the polygon mirror 30 can be reduced. Specifically, the width h of the opening 34 is set to t+1 (mm) or less relative to the width t of the polygon mirror. Further, a glass window 35 is fixed on the opening by glue or double-sided tape, etc. and closes the space.

A part of the printed-circuit board 22 is exposed between the cover 33 and the housing 21 and a connector 25 is fixed on the exposed portion. Moreover, a seal member 36 is installed between the cover 33 and the housing 21 and the space between the cover 33 and the housing 21 is closed thereby.

This seal member 36 is composed of rubber and is foamed in sponge state so that it can have elasticity. The seal member is compressively installed between the cover 33 and the housing 21 so that closing can be improved. As the polygon scanner generates heat when it rotates, the seal member 36 is desirably composed of silicon rubber or EPDM, etc. because it does not change in quality by heat and does not soil the polygon mirror 30 by its evaporation.

On the other hand, magnets 37–39 are fixed on the fixed shaft 26, the mirror keeper 31 and the cover 33 respectively. A fine pore 34 is formed in the mirror keeper for attenuating vibration of the rotor. The same poles of those magnets face each other and the magnet 38 repels in the vertical direction. Thus the rotor is floated and supported in the vertical direction.

Next, the operation of the first embodiment will be described.

A three phase alternating voltage is applied to the wiring coils 23 and a rotating magnetic field is generated around the rotating shaft 27. The magnets 29 repel and attract the rotating magnet field and the hollow rotating shaft 27 with the magnets rotates. At that time, the laser beam is input through the glass window 35 at the opening 34 to the mirror surface 30a of the polygon mirror 30 and is reflected by the rotating polygon mirror 30.

At that time, though a turbulent flow is generated around the polygon mirror 30, it is recognized by our experiment that this turbulent flow is much less than that of the prior art. This result is shown in FIG. 2.

Figure 2:
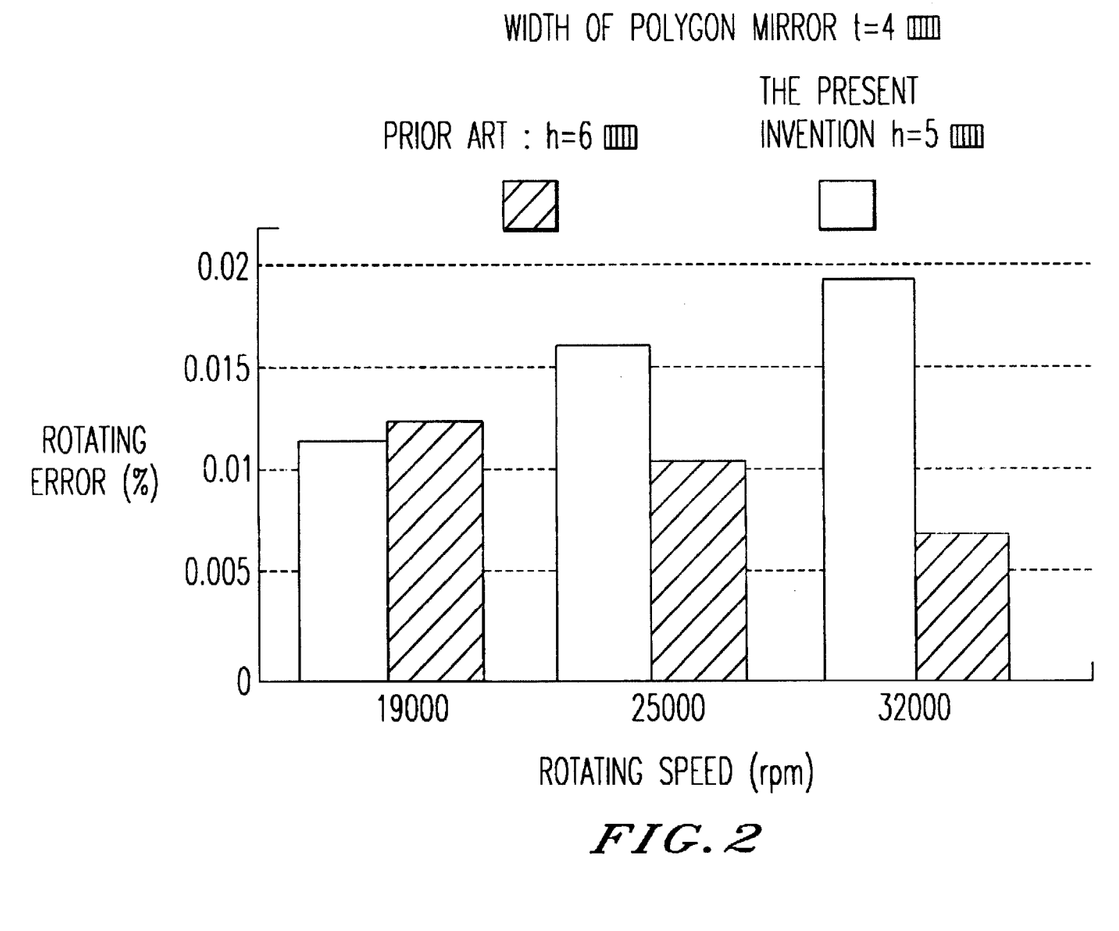
FIG. 2 shows relationship between rotating error and rotating speed of a polygon scanner of the present invention and a prior art scanner.

FIG. 2 shows the result wherein rotating error is measured in case that width h of the opening 34 is 5 mm of the present invention (cross-hatched bars) and it is 6 mm of the prior art (open bars) when the polygon mirror, which has a radius of the circumscribed circle 41 of 21 mm and the thickness of 4 mm, rotates at rotating speed of 19000, 25000 and 32000 rpm.

As shown in FIG. 2, in the prior art, as the rotating speed is higher, the rotating error is higher. On the other hand, in this embodiment, as the rotating speed is higher, the rotating error is lower. This is because, in the prior art, as the rotating speed is higher and the flow speed of the air around the polygon mirror is higher, the turbulent flow is higher whereby the rotating error is higher.

In this embodiment, the width h of the opening 34 in the vertical direction is set to t+1 (mm) or less relative to the width t of the polygon mirror 30. Thus even if the flow speed of the air around the polygon mirror 30 is higher, the turbulent air is reduced and therefore the rotating error is reduced at high speed rotating. Further, the power consumption in driving the scanner can be decreased 5 to 10% compared to the prior art. As a result, the reliability of the polygon scanner is improved.

Moreover, in this embodiment, having the dynamic pressure air bearing produced by the herringbone grooves 26a and 26b of the rotating shaft, the turbulent flow around the polygon mirror is reduced and the rotor is capable of rotating at a high speed of 15000 rpm or more. That is, the turbulent air is effectively reduced when the rotating speed is 18000 to 20000 rpm in FIG. 2 and the peripheral speed is 40 to 44 m/sec. Thus, the dynamic pressure air bearing is most suitable to small size, low cost and low noise in the rotating speed range in FIG. 2.

In this embodiment, although the case where the radius of the circumscribed circle of the polygon mirror 30 is 21 mm is described, if the radius of the circumscribed circle is 42 mm which is twice 21 mm, a rotating speed of 9000 to 10000 rpm corresponds to the peripheral speed of 40 to 44 m/sec. This is high speed of 144 to 158 km/sec. Therefore if the peripheral speed is higher than the above speed, the turbulent flow around the polygon mirror 30 is capable of being reduced, as with the above embodiment.

Figure 3A:
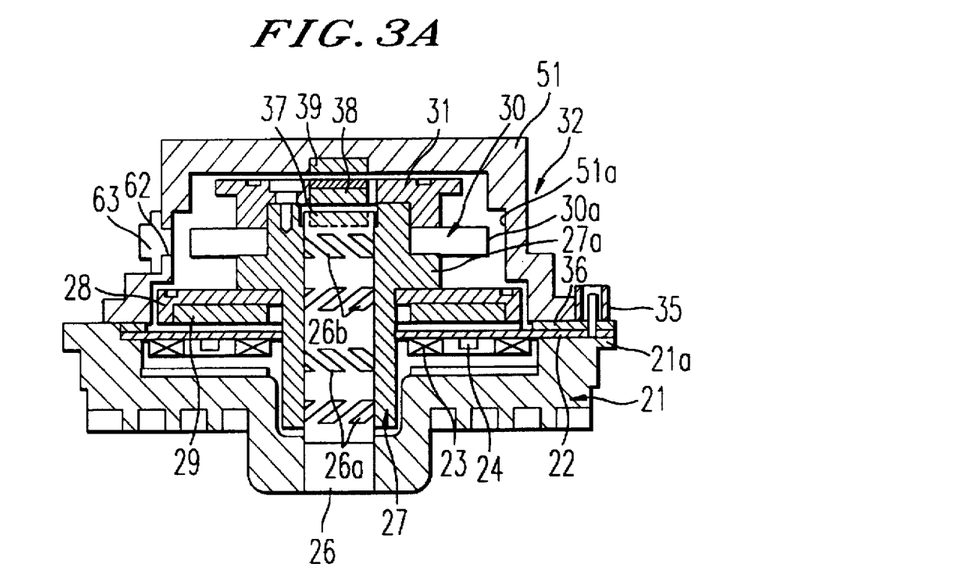
FIG. 3(a) is a vertical sectional view showing a closed type polygon scanner of a second embodiment of the present invention.
Figure 3B:
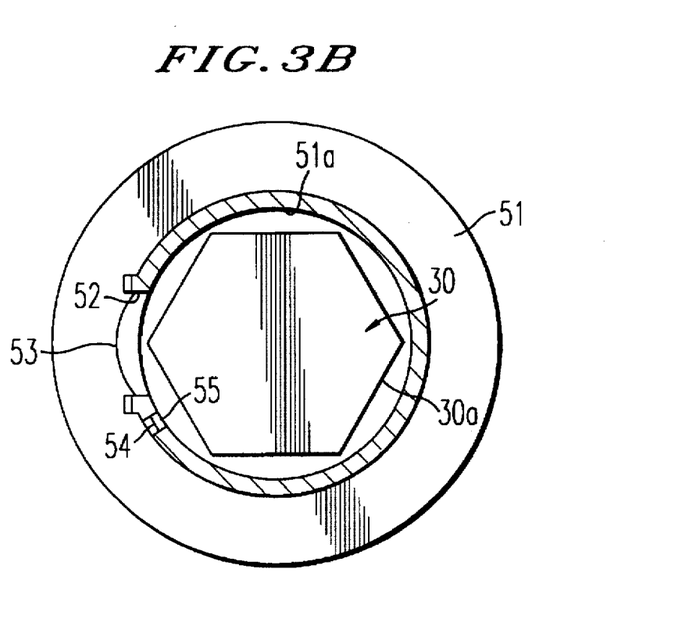
FIG. 3(b) is a horizontal sectional view showing a main part of the polygon scanner of the second embodiment of the present invention.

FIG. 3 shows a second embodiment. The same elements as the above embodiment are designated by the same numerals and those description is omitted.

In FIG. 3, an inner surface 51a of a cover 51 facing the mirror surface 30a of the polygon mirror 30 is formed cylindrically and almost coaxially to the rotating axis of the rotor 32. An opening 52 is formed at a predetermined part of the inner surface of the cover 51. A convergent lens 53 is fixed at the opening 52 and has the almost same curvature as the inner surface 51a of the cover 51 in the peripheral direction. Therefore a whole inner surface of the cover 51 facing the mirror face 30a of the polygon mirror 30 is formed as a completely continuous cylinder and almost coaxially to the rotating axis of the rotor 32.

An opening 54 is formed in the inner surface of the cover 51a and a window 55 is fixed at the opening 54. The laser beam is input to the polygon mirror through this window 55. As the laser beam passes through this window 55 only when it is input to the polygon mirror, its size is capable of being small.

In this embodiment, the whole inner surface of the cover 51 including the lens 53 is formed as a completely continuous cylinder. The turbulent flow around the polygon mirror is reduced and therefore the rotating error of the rotor 32 is reduced and the power consumption in driving the scanner is reduced, whereby the reliability of the polygon scanner is improved.

The convergent lens 53 may have the function of a F θ lens, through which the laser beam reflected on the polygon mirror 30 scans on a photoconductive body (not shown in the Figure) at the same scanning speed.

Figure 4A:
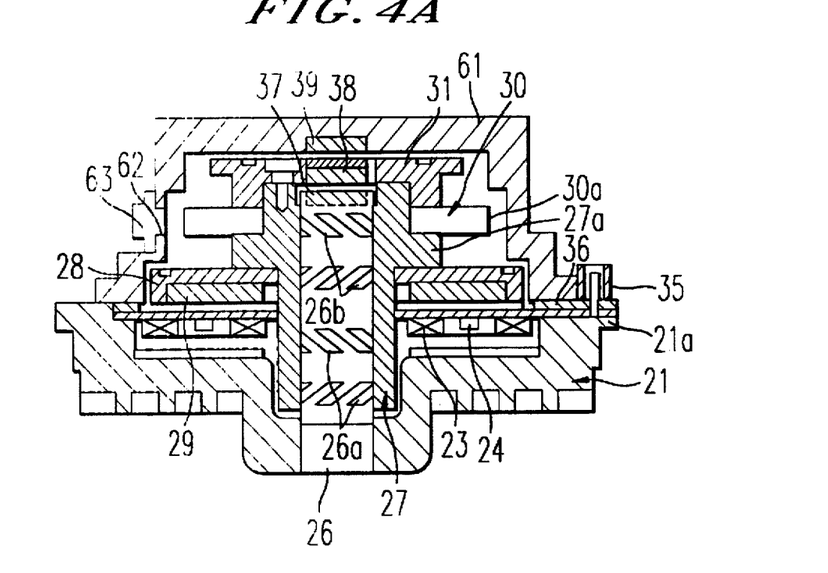
FIG. 4(a) is a vertical sectional view showing a closed type polygon scanner of a third embodiment of the present invention.
Figure 4B:
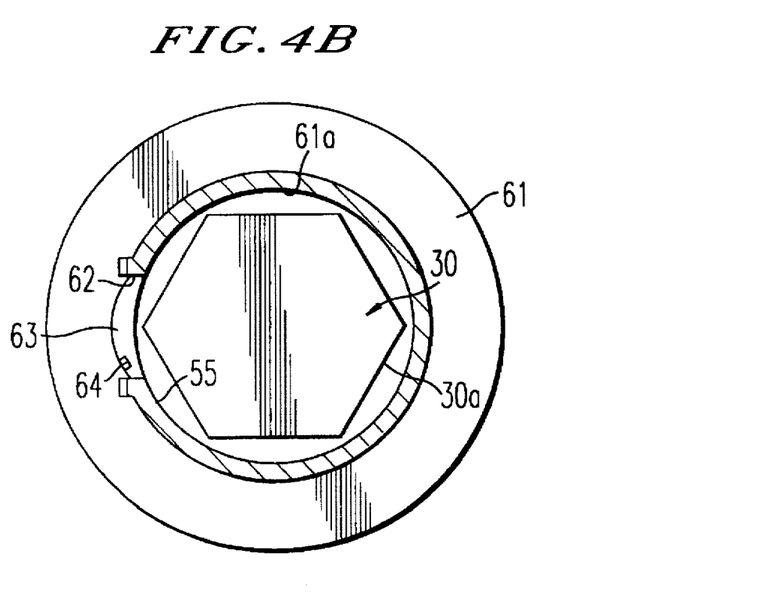
FIG. 4(b) is a horizontal sectional view showing a main part of the polygon scanner of the third embodiment of the present invention.

FIG. 4 shows a third embodiment. The same elements as the above embodiment are designated by the same numerals and their description is omitted.

In FIG. 4, an inner surface 61a of the cover 61 facing the mirror surface 30a of the polygon mirror 30 is formed almost cylindrically and almost coaxially to the rotating axis of the rotor 32. An opening 62 is formed at a predetermined part of the inner surface 61a of the cover 61. A plastic convergent lens 63 is fixed at the opening 62 and has the almost same curvature as the inner surface 61a of the cover 61 in the peripheral direction.

A window 64 not having the curvature of lens 63 is uniformly formed at a portion for inputting the laser beam in the lens 63. The laser beam is input to the polygon mirror through this window 64 and is reflected from the polygon mirror to the photoconductive body through a lens portion of curvature in the lens 63. A beam shaping lens as an alternative to the window 64 may be employed.

Thus as the input portion and the output portion are formed uniformly in the plastic lens 63, the cost of the polygon scanner is capable of being reduced in addition to the technical advantages in the above embodiments.

Finally, the technical advantages of the scanner according to the invention will be described.

According to the first embodiment, the turbulent air is reduced and therefore the rotating error is reduced at high speed rotating. Further, the power consumption in driving the scanner is decreased. As a result, the reliability of the polygon scanner is improved.

According to the second embodiment, the turbulent flow around the polygon mirror is reduced and therefore the rotating error of the rotor 32 is reduced and the power consumption in driving the scanner is reduced, whereby the reliability of the polygon scanner is improved.

According to the third embodiment, the cost of the polygon scanner is reduced in addition to the technical advantages in the above embodiments.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A closed type polygon scanner comprising:
    a housing;
    a rotor which is rotatively supported to a shaft fixed to the housing, and which includes a polygon mirror;
    a motor which generates a magnetic force to rotate the rotor;
    a cover which covers the rotor and is attached to the housing;
    an opening which is formed at a predetermined portion in the cover facing a mirror surface of the polygon mirror, and at least translucent to a laser beam;
    a window member fixed to the opening;
    wherein an inner peripheral surface of the cover facing the mirror surface of the polygon mirror is formed cylindrically about a rotating axis of the rotor, and a width in the rotating axis direction of the opening is set to a predetermined width relative to a width in said rotating axis direction of the polygon mirror.

2. The closed type polygon scanner of claim 1, wherein the width in the rotating axis direction of the opening is no more than approximately one mm more than the width in the rotating axis direction of the polygon mirror.

3. The closed type polygon scanner of claim 1, wherein the rotor is rotatively supported about the shaft by a dynamic pressure air bearing.

4. The closed type polygon scanner of claim 1, wherein a peripheral speed of a circumscribed circle of the polygon mirror is 40 meters per second or more.

5. The closed type polygon scanner of claim 1, wherein said width of said opening is set to reduce turbulent air generated around the polygon mirror.

6. The closed type polygon scanner of claim 1, comprising said polygon mirror being formed cylindrically and substantially coaxially about the rotating axis of the rotating shaft.

7. A closed type polygon scanner comprising:
    a housing;
    a rotor which is rotatively supported to a shaft fixed to the housing, and which includes a polygon mirror;
    a motor which generates a magnetic force to rotate the rotor;
    a cover which covers the rotor and is attached to the housing;
    an opening which is formed at a predetermined portion in the cover facing a mirror surface of the polygon mirror, and at least translucent to a laser beam;
    wherein an inner peripheral surface of the cover facing the mirror surface of the polygon mirror is formed cylindrically about a rotating axis of the rotor, a convergent lens which has a same curvature as the inner peripheral surface of the cover facing the mirror surface of the polygon mirror is fixed to the opening, and a whole inner peripheral surface of the cover facing the mirror surface of the polygon mirror is formed in a continuous cylindrical state about the rotating axis of the rotor.

8. The closed type polygon scanner of claim 7, wherein the convergent lens is plastic and has an input portion having a second curvature different from the curvature of the convergent lens through which a laser beam is input to the polygon mirror.

9. The closed type polygon scanner of claim 7, wherein the convergent lens is a F θ lens.

10. The closed type polygon scanner of claim 7, wherein a width in the rotating axis direction of the opening is set to an predetermined width relative to a width of the polygon mirror to reduce turbulent air generated around the polygon mirror.

11. The closed type polygon scanner of claim 7, wherein the rotor is rotatively supported about the shaft by a dynamic pressure air bearing.

12. The closed type polygon scanner of claim 7, wherein a peripheral speed of a circumscribed circle of the polygon mirror is 40 meters per second or more.

13. The closed type polygon scanner of claim 7, comprising said polygon mirror being formed cylindrically and substantially coaxially about the rotating axis of the rotating shaft.

14. The closed type polygon scanner of claim 7, comprising:
    a second opening in the cover; and
    a window formed in the second opening.

15. The closed type polygon scanner of claim 14, comprising:
    a laser beam source emitting a laser beam, wherein the laser beam enters the cover through the second opening and exits the cover through the opening.

* * * * *